W. HORTON.
Vise.
No. 162,069.
Patented April 13, 1875.
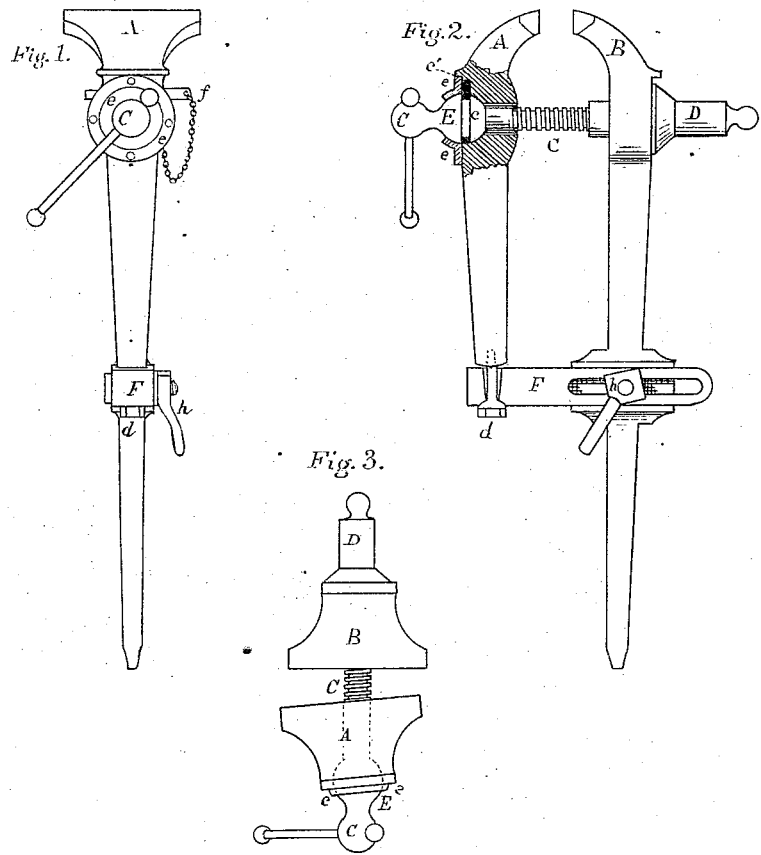

UNITED STATES PATENT OFFICE.

WRIGHT HORTON, OF PEEKSKILL, NEW YORK.

IMPROVEMENT IN VISES.

Specification forming part of Letters Patent No. 162,069, dated April 13, 1875; application filed December 24, 1874.

*To all whom it may concern:*

Be it known that I, WRIGHT HORTON, of Peekskill, county of Westchester, State of New York, have invented certain Improvement in Vises, of which the following is a specification:

The object of this invention is to construct a parallel vise, which, by slight changes, quickly and easily made, can be adapted to holding forms whose sides may not be parallel, such as keys, wedges, &c.

Figure 1 is a front view of the vise, showing devices in position for holding the jaws parallel to each other. Fig. 2 is a partly sectional view of the vise, representing the manner of constructing the screw, of swiveling the stem of the front jaw, and the strap for adjusting the jaws to parallel positions. Fig. 3 represents the vise-jaw swinging on the ball of the screw in positions for grasping wedge-shaped forms.

In constructing my vise, I purpose enlarging the stem of the back-jaw B at a suitable distance below the nut D, the enlargement to be provided with guides on either side to receive the strap F, Fig. 2. A bolt, passing through this enlargement and the slots in the strap, is provided with a head on one end, and on the other a hand-nut, $h$, for readily securing the strap at any desired point. To the forward and solid end of this strap I pivot the stem of the front jaw A. To secure this stem against rising from its socket in the strap I introduce the bolt $d$, both the bolt-head and the lower end of the stem being provided with rounded shoulders, where they rest against the strap, to admit of a perfectly free movement. But the bolt may be dispensed with, in which case a reduced end of the stem rests in a simple socket in the strap. The screw C of this vise I provide with a ball under the head, which ball is secured in a socket in the stem of the front jaw, as shown at E, Fig. 2. The ball is furnished with a groove, $c$, which, in connection with a slot, $c'$, in the stem, is intended to receive a key, the object being to secure the jaws at right angles to the screw when the vise is to be used as a parallel vise. The key is shown in position at $f$, Fig. 1. The cap $e$, Figs. 1 and 2, confines the ball E in its socket.

I use the form of nut common to most vises, as shown at D, having a square shoulder in contact with the stem; but when greater freedom of movement of the front jaw is required I employ a nut with a round shoulder, which rests in a corresponding socket in the stem B, through which the nut passes.

Fig. 3 shows the movement of the front jaw of the vise on the ball of the screw. In closing the vise, this jaw adapts its position to the form of the piece to be grasped, by reason of the ball-and-socket joint and the pivoted or swiveled stem.

When it is to be used as a parallel vise, the key $f$ is slipped in place, and other adjustments are made by movements of the strap F.

I claim as my invention—

1. A vise-screw, with a ball working in a socket in the swiveled jaw, substantially as and for the purpose herein described and set forth.

2. A vise-screw, with a ball, working as described, the ball being provided with a groove, which, in connection with a slot in the stem, admits a key, to retain the jaws in proper position for a parallel vise, substantially as and for the purpose herein described and set forth.

WRIGHT HORTON.

Witnesses:
IRA TOMPKINS,
SAMUEL CHANDLER.